United States Patent [19]

Schlesinger

[11] 4,080,274

[45] Mar. 21, 1978

[54] PHOTOPOLYMERIZATION OF LACTONE-EPOXIDE MIXTURES WITH AROMATIC DIAZONIUM SALTS AS PHOTOCATALYST

[75] Inventor: Sheldon Irwin Schlesinger, East Windsor Township, Mercer County, N.J.

[73] Assignee: American Can Company, Greenwich, Conn.

[21] Appl. No.: 585,573

[22] Filed: Jun. 10, 1975

Related U.S. Application Data

[63] Continuation-in-part of Ser. No. 436,153, Jan. 24, 1974, abandoned, which is a continuation-in-part of Ser. No. 292,759, Sep. 27, 1972, abandoned, which is a continuation-in-part of Ser. No. 753,869, Aug. 20, 1968, Pat. No. 3,708,296.

[51] Int. Cl.$^2$ .................. B01J 1/10; G03C 1/70; G03C 1/54

[52] U.S. Cl. ................. 204/159.18; 96/35.1; 96/75; 96/91 R; 96/115 P; 96/115 R; 204/159.14; 204/159.22; 204/154.1; 204/159.23; 204/159.24; 260/142

[58] Field of Search ............... 96/91 R, 75, 115 R; 204/159.14, 159.18, 159.22, 159.23, 159.24; 260/141, 142, 178.3 R, 178.3 UA

[56] References Cited

U.S. PATENT DOCUMENTS

| | | | |
|---|---|---|---|
| 2,374,563 | 4/1945 | Reichel | 96/91 R |
| 2,613,149 | 10/1952 | Unkauf | 96/91 R |
| 2,856,370 | 10/1958 | Muetterties | 260/2 |
| 3,155,513 | 11/1964 | Sorensen | 96/91 R |
| 3,203,803 | 8/1965 | Habib et al. | 96/91 R |
| 3,205,157 | 9/1965 | Licari et al. | 96/91 R |
| 3,294,743 | 12/1966 | Mack | 260/78.3 R |
| 3,295,974 | 1/1967 | Erdmann | 96/91 R |
| 3,303,028 | 2/1967 | Aebi et al. | 96/91 R |
| 3,524,866 | 8/1970 | Klootwijk et al. | 260/141 |
| 3,666,474 | 5/1972 | Moore | 96/91 R |
| 3,711,390 | 1/1973 | Feinberg | 96/91 R |

FOREIGN PATENT DOCUMENTS

| | | | |
|---|---|---|---|
| 1,018,559 | 1/1966 | United Kingdom | 260/78.3 R |

OTHER PUBLICATIONS

Furakawa, J., *Polymerization of Aldehydes and Oxides*, Interscience Publishers, N.Y., 1963, pp. 130-131 and 147-148.

Dreyfuss et al., Journal of Polymer Science, Part A-1, vol. 4, 1966, pp. 2179-2180, 2191-2192, and 2198-2199.

Kosar, J., "Light-Sensitive Systems", J. Wiley & Sons, 1965, pp. 194-201 and 263-264.

*Primary Examiner*—Charles L. Bowers, Jr.
*Attorney, Agent, or Firm*—Robert P. Auber; Ira S. Dorman; Ernestine C. Bartlett

[57] ABSTRACT

Polymerization of polymerizable compositions comprising mixtures of lactones with monomeric or prepolymeric epoxides is effected by mixing such compositions with radiation-sensitive aromatic diazonium salts which decompose upon application of energy such as electromagnetic radiation to release Lewis Acid to initiate polymerization of said monomers.

15 Claims, No Drawings

PHOTOPOLYMERIZATION OF LACTONE-EPOXIDE MIXTURES WITH AROMATIC DIAZONIUM SALTS AS PHOTOCATALYST

CROSS-REFERENCE TO RELATED APPLICATION

This application is a continuation-in-part of application Ser. No. 436,153 filed Jan. 24, 1974 now abandoned which was a continuation-in-part of Ser. No. 292,759, filed Sept. 27, 1972 entitled "Photopolymerization of Lactones" now abandoned which was itself a continuation-in-part of application Ser. No. 753,869, filed Aug. 20, 1968, entitled "Photopolymerization of Epoxy Monomers," now U.S. Pat. No. 3,708,296 issued Jan. 2, 1973.

BACKGROUND OF THE INVENTION

In my U.S. Pat. No. 3,708,296 referred to hereinabove, there are disclosed epoxide-containing materials which are photopolymerizable via use of organic compounds which are radiation-sensitive and release an active catalyst upon exposure to electromagnetic radiation. It has now been discovered that the novel radiation-sensitive catalyst precursors disclosed and claimed therein are effective to initiate photopolymerization of another class of related cyclic monomeric materials, namely lactones, and mixtures thereof with other materials polymerizable through the action of such catalyst precursors such as epoxides.

The invention more specifically relates to polymerizable compositions comprising mixtures of a monomeric lactone with monomeric or prepolymeric epoxides and radiation-sensitive aromatic diazonium salts of complex halogenides and process for polymerization of such compositions.

To effect polymerization of the above defined monomers, it is believed to be necessary to open the ring of the monomer through cleavage of the carbon-oxygen bond. A reactive intermediate is formed which can subsequently open up another lactone and epoxide ring and this reaction may repeat itself many times in a chain reaction to form a polymer of repeating ester and ether units.

Previously, isolated instances have been reported in the literature wherein lactones have been polymerized by the action of electromagnetic radiation. This can be achieved by selecting a region of the electromagnetic spectrum to which the monomer responds to form an initiating species that causes the polymer chain to grow. For example, Hayashi et al in Die Makromolekulare Chemie, pp. 230–237 (1961) have reported that gamma radiation will effect polymerization of propiolactone. However, this type of reaction has not been believed to be generally applicable to most lactones and additionally gamma radiation is not a convenient source of radiation and is not as useful as the ultraviolet and visible regions of the spectrum. Therefore, heretofore polymerization of lactones has been carried out by heating the monomer in which a chemical compound was incorporated until catalysts contained therein were activated, for example, as disclosed in U.S. Pat. No. 3,371,965. The activation of the catalyst upon heating thereby initiated polymerization of the various monomers. These methods, though successful, are unsatisfactory in that careful attention must be given to staying within the temperature limitations of the system involved. In order to prevent the harmful effects of heat curing, it is often necessary to extend the curing cycle an unreasonable length of time. Many of the prior art aryl diazonium salts, for example, perchlorates are explosively hazardous and tend to be chemically unstable. Furthermore, unexpectedly, it has been discovered that the catalyst activity and resulting usefulness of aryldiazonium compounds cannot be determined on a random basis. Moreover, it has been unexpectedly discovered that many aryldiazonium compounds do not possess the requisite properties necessary to catalyze the wide variety of monomeric polymerizable materials of this invention. Accordingly, it is desirable to identify new and improved catalyzing agents useful in the photopolymerization of lactones which are not subject to and overcome the deficiencies now existing in the art.

SUMMARY OF THE INVENTION

This invention relates to polymerizable materials comprising mixtures of a monomeric lactone with other materials polymerizable therewith, for example, epoxides in admixture with a radiation-sensitive catalyst precursor which decomposes upon exposure to electromagnetic or electron-beam irradiation to provide a Lewis Acid effective to initiate polymerization of said polymerizable material.

The invention further relates to methods of polymerizing such materials by subjecting the same to electromagnetic or electron beam irradiation.

DETAILED DESCRIPTION

The monomers defined hereinabove may be a mixture including any lactone which is polymerizable to higher molecular weights through the action of a cationic catalyst with an epoxide material.

Lactones are cyclic esters derived from hydroxy acids generally having the formula

wherein $R_1$ or $R_2$ is hydrogen or alkyl, preferably lower alkyl containing 1 to 6 carbon atoms and $y$ is the number of methylene groups, generally ranging from 1–13. Such cyclic esters suitable for use herein are derived from hydroxy acids containing between 2 to 15 carbon atoms including the beta, gamma, delta and epsilon forms of propiolactone, butyrolactone, caprolactone, pivalolactone, valerolactone, octanoic lactone, pentadecylic lactone, etc. Especially preferred are B-propiolactone and E-caprolactone. Many of such compounds are readily available commercially or their preparation is readily had by methods known in the art for example by intramolecular conversion of the corresponding hydroxy acid effected by heating.

As disclosed hereinabove, compositions of the invention comprise mixtures of said lactones with other polymerizable materials such as monomeric and prepolymeric epoxides. Any epoxide material or mixture of such epoxide materials, of suitable viscosity alone or when dissolved in a suitable solvent, polymerizable to higher molecular weights may be utilized. Thus monomeric, prepolymeric or resinous epoxides may be employed in the instant compositions. The classic epoxy resin is obtained by the well known reaction of epichlorohydrin and bisphenol A (4,4'-isopropylidene diphenol). The reaction product is believed to have the form of a polyglycidyl ether of bisphenol A, (the glycidyl group being more formally referred to as the 2,3-epoxypropyl group) and thus may be thought of as a polyether derived from the diphenol and glycidol (2,3-epoxy-1-propanol). The structure usually assigned to the resinous product is

where R is alkyl, that is glycidyl alkyl ethers. One such mixture contains predominantly glycidyl octyl ether and decyl glycidyl ether; another contains dodecyl glycidyl ether and glycidyl tetradecyl ether. Epoxidized novolac and epoxy cresol novolac prepolymers likewise may be used, as well as polyolefin (e.g., poly-

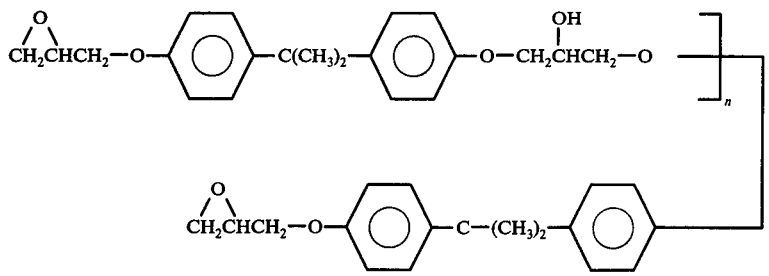

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A ($n=0$), which may be named 2,2-bis[p-(2,3-epoxypropoxy)phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be crosslinked or otherwise polymerized in accordance with the invention, whereby cleavage of the terminal epoxy or oxirane rings is initiated by the action of the Lewis Acid halide released when energy is applied to the latent polymerization catalyst.

Many other epoxide materials are available in polymerizable monomeric or prepolymeric forms. Among these are 1,2-epoxycyclohexane (cyclohexene oxide, also named 7-oxabicyclo[4.1.0]heptane) and vinylcyclohexene dioxide, more specifically named 3-(epoxyethyl)cyclohexane. Ethylene oxide (oxirane,

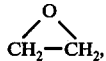

the simplest epoxy ring) and its homologues generally, e.g., propylene oxide (1,2-epoxypropane) and 2,3-epoxybutane, are themselves useful. Other epoxidized cycloalkenes may be used, a readily available polycyclic diepoxide being dicyclopentadiene dioxide, more specifically identified as 3,4-8-9-diepoxytricyclo[5.2.1.0$^{2,6}$]-decane.

Glycidyl esters of acrylic acid and of its homologs, methacrylic acid and crotonic acid, are vinyl epoxy monomers of particular interest. Other such monomers include allyl glycidyl ether (1-allyloxy-2,3-epoxypropane) and copolymers thereof, particularly as disclosed and claimed in co-pending U.S. Application, Ser. No. 297,829 filed Oct. 16, 1972 and glycidyl phenyl ether (1,2-epoxy-3-phenoxypropane). Another readily available product is a mixture of ethers of the structure ethylene) epoxides. The latter are exemplified by epoxidized, low molecular weight by-products of the polymerization of ethylene, which may be separated as mixtures high in 1 alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxycyclohexyl)methyl 3,4-epoxycyclohexanecarboxylate; this same ester may be indexed under the name 7-oxabicyclo[4.1.0]hept-3-ylmethyl 7-oxabicyclo[4.1.0]-heptane-3-carboxylate. Another suitable diepoxide may be obtained as an ester of a substituted (epoxycycloalkyl)methylcyclohexyl)methyl adipate, which may be named alternatively bis[4-methyl-7-oxabicyclo[4.1.0]-hept-3-yl)methyl] adipate. Diepoxide monomeric materials may be obtained conveniently as bis(epoxyalkyl) ethers of glycols, an example being the diglycidyl ether of 1,4-butanediol, that is, 1,4-bis-(2,3-epoxypropoxy)butane. This diepoxide is related to the diglycidyl ether of bisphenol A, shown above as 2,2-bis[p-(2,3-epoxypropoxy)phenyl]propane.

Other examples of suitable epoxide materials are epoxy alkyl ethers of alkyl silanes such as glycidoxypropyl trimethoxysilane.

The materials utilized as latent polymerization initiators in the process and compositions of the present invention are radiation-sensitive catalyst precursors which decompose to provide a Lewis acid upon exposure to electromagnetic or electron-beam irradiation. The irradiation required for effective decomposition may be applied by bombardment with charged particles, notably by high-energy electron beam irradiation. Preferably, however, the catalyst precursors are photosensitive, and are exposed to actinic irradiation, which is most effective at those regions of the electromagnetic spectrum at which there is high absorption of electromagnetic energy by the particular catalyst precursor used. More than one of these types of irradiation may be applied to the same system; e.g., ultraviolet light irradiation followed by electron beam irradiation, may be employed, although ultraviolet light irradiation ordinarily can effect a suitable cure.

The preferred photosensitive Lewis acid catalyst precursors are aromatic diazonium salts of complex halogenides, which decompose upon application of energy to release a halide Lewis acid. The aromatic diazonium cation may be represented generally as $[Ar-N{\equiv}N]^+$, where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by $[MX_{n+m}]^{31\ m}$. Thus, the photosensitive salt and its decomposition upon exposure to actinic irradiation may be depicted as follows:

$$[Ar-N{\equiv}N]_m [MX_{n+m}]^{-m} \xrightarrow{h\nu} mAr-X + mN_2 + MX_n, \quad (1)$$

where X is the halogen ligand of the complex halogenide, M is the metallic or metalloid central atom thereof, m is the net charge on the complex halogenide ion, and is an integer of 1 to 2 and n is the oxidation state of M and the number of halogen atoms in the halide Lewis acid compound released and is an integer of 3 to 5. The Lewis acid halide $MX_n$ is an electron pair acceptor, such as $SnCl_4$, $PF_5$, $AsF_5$, $SbF_5$ and $BiCl_3$, which upon suitable irradiation of the diazonium complex salt is released in substantial quantities and initiates or catalyzes the polymerization process, wherein the monomeric or prepolymeric material is polymerized or cured as the result of the actinic irradiation.

The diazonium compounds of the present invention may be prepared using procedures known in the art, and such preparation forms no part of the present invention. Thus, for example, chlorometallic halogenide complexes may be prepared in accordance with the method set forth by Lee et al in *Journal of the American Chemical Society*, 83, 1928 (1961). Exemplifying a procedure of general utility, aryldiazonium hexafluorophosphates can be prepared by diazotizing the corresponding aniline with $NOPF_6$, made by combining HCl and $NaNO_2$ with subsequent addition of hydrogen hexafluorophosphate ($HPF_6$) or of a hexafluorophosphate salt, or they can be prepared by addition of a hexafluorophosphate salt to another diazonium salt to effect precipitation. As a further example, various morpholinoaryl complexes, containing the group

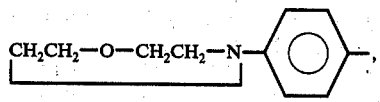

can be prepared either from the aniline derivative or by adding an aqueous solution of a metal salt of the desired complex halogenide to a solution of morpholinobenzenediazonium tetrafluoroborate.

Illustrative of the aromatic diazonium cations comprised in the photosensitive catalyst salts utilized in accordance with the present invention are the following:

p-chorobenzenediazonium
2,4-dichlorobenzenediazonium
2,5-dichlorobenzenediazonium
2,4,6-trichlorobenzenediazonium
2,4,6-tribromobenzenediazonium
o-nitrobenzenediazonium
p-nitrobenzenediazonium
4-nitro-o-toluenediazonium
    (2-methyl-4-nitrobenzenediazonium)
2-nitro-p-toluenediazonium
    (4-methyl-2-nitrobenzenediazonium)
6-nitro-2,4-xylenediazonium
    (2,4-dimethyl-6-nitrobenzenediazonium)
2-chloro-4-(dimethyl-6-nitrobenzenediazonium)
4-chloro-2,5-dimethoxybenzenediazonium
2,4',5-triethoxy-4-biphenyldiazonium
    (2,5-diethoxy-4-(p-ethoxyphenyl)benzenediazonium)
2,5-dimethoxy-4'-methyl-4-biphenyldiazonium
    (2,5-dimethoxy-4-(p-tolyl)benzenediazonium)
2,5-diethoxy-4-(phenylthio)benzenediazonium
2,5-diethoxy-4-(p-tolylthio)benzenediazonium
p-morpholinobenzenediazonium
2,5-dichloro-4-morpholinobenzenediazonium
2,5-dimethoxy-4-morpholinobenzenediazonium
4-(dimethylamino)-naphthalenediazonium Illustrative of the complex halogenide anions comprised in the photosensitive catalyst salts utilized in accordance with the present invention are the following:

hexachlorostannate(IV), $SnCl_6^{2-}$
hexafluorophosphate, $PF_6$
hexafluoroarsenate(V), $AsF_6$
hexafluoroantimonate(V), $SbF_6$
pentachlorobismuthate(III), $BiCl_5^{2-}$ A selection of aromatic diazonium salts of complex halogenides is listed in Table I. Many of the salts listed have been found to be well adapted or superior for use as latent photosensitive polymerization initiators in the process and compositions of the present invention, based on thermal stability, on solubility, and stability in the monomer formulations and solvents (if any) used, on photosensitivity, and on ability to effect polymerization with the desired degree of curing after adequate actinic irradiation. Following the name of each aromatic diazonium halogenide is its melting point or decomposition temperature in degrees centigrade, and wavelengths of electromagnetic radiation, in nanometers, at which it exhibits absorption maxima.

TABLE I

|  | M.P.,[1] °C. | Abs'n Max., nm. |
|---|---|---|
| 2,4-dichlorobenzenediazonium hexachlorostannate(IV) | 190 | 285 |
| p-nitrobenzenediazonium hexachlorostannate(IV) | 126 | 258, 310 |
| p-chlorobenzenediazonium hexa- | 162-164 | 273 |

TABLE I-continued

| | M.P.,[1] °C. | Abs'n Max., nm. |
|---|---|---|
| fluorophosphate | | |
| 2,5-dichlorobenzenediazonium hexafluorophosphate | dec. 140 | 264, 318 |
| 2,4,6-trichlorobenzenediazonium hexafluorophosphate | 240–250 | 294, 337 |
| 2,4,6-tribromobenzenediazonium hexafluorophosphate | 245–260 | 306 |
| p-nitrobenzenediazonium hexafluorophosphate | 156(178)[1] | 258, 310 |
| o-nitrobenzenediazonium hexafluorophosphate | 161.5 | |
| 4-nitro-o-toluenediazonium hexafluorophospate | 123(138) | 262, 319 |
| 2-nitro-p-toluenediazonium hexafluorophosphate | 164–165 | 286 |
| 6-nitro-2,4-xylenediazonium hexafluorophosphate | 150 | 237, 290 |
| p-morpholinobenzenediazonium hexafluorophosphate | 162(181) | 377 |
| 4-chloro-2,5-dimethoxybenzenediazonium hexafluorophosphate | 168–169 (198–208) | 243 (shoulder), 287, 392 |
| 2,5-dimethoxy-4-morpholinobenzenediazonium hexafluorophosphate | Above 135 | 266, 396 |
| 2-chloro-4-(dimethylamino)-5-methoxybenzenediazonium hexafluorophosphate | 111 | 273, 405 |
| 2,5-dimethoxy-4-(p-tolylthio)benzenediazonium hexafluorophosphate | 146(155) | 358, 400 |
| 2,5-diethoxy-4-(p-tolylthio)benzenediazonium hexafluorophosphate | 147(150) | 223 (shoulder), 247, 357, 397 |
| 2,5-dimethoxy-4'-methyl-4-biphenyldiazonium hexafluorophosphate | 167 | 405 |
| 2,4',5-triethoxy-4-biphenyldiazonium hexafluorophosphate | 136 | 265, 415 |
| 4-(dimethylamino)-1-naphthalenediazonium hexafluorophosphate | 148 | 280, 310, 410 |
| p-nitrobenzenediazonium hexafluoroarsenate(V) | 141–144 (161) | 257, 310 |
| p-morpholinobenzenediazonium hexafluoroarsenate(V) | 162 (176–177) | 257, 378 |
| 2,5-dichlorobenzenediazonium hexafluoroantimonate(V) | 161–162.5 | 238, 358 |
| p-nitrobenzenediazonium hexafluoroantimonate(V) | 140–141 | 257, 308 |
| p-morpholinobenzenediazoniumhexafluoroantimonate(V) | 153 (177.5–180.5) | 254, 374 |
| 2,4-dichlorobenzenediazonium hexachloroantimonate(V) | 178–180 | 279, 322 (shoulder) |
| 2,4-dichlorobenzenediazonium pentachlorobismuthate(III) | 193.5–195 | 285, 313 |
| o-nitrobenzenediazonium pentachlorobismuthate(III) | 166.5–168 | 285, 313 |

Note 1— The melting points given in Table I were determined generally by the usual visual capillary tube method; in most cases discoloration began below the observed mellting point temperature with frothing decomposition at that temperature. In some cases melting points or exotherms were determined also by differential thermal analysis under nitrogen gas, and the temperatures so determined are given in parentheses. The wavelengths of absorption maxima in the ultraviolet-to-visible range were determined with the diazonium complex salt dissolved in acetonitrile.

In accordance with the present invention, the procedures for admixing the radiation-sensitive compounds with the polymerizable materials are relatively simple and can be carried out in the following manner:

a mixture containing the monomers as heretofore defined is combined with a radiation-sensitive aryldiazonium compound of the invention. Suitable inert solvents may be employed if desired in effecting this admixture. By a suitable inert solvent is meant one that does not react appreciably with the polymerizable material or the aryldiazonium compound before exposure to actinic radiation. Examples of such solvents include dimethyl ether of diethylene glycol, anisole, acetonitrile, butyronitrile, toluene, acetone, xylene, methyl ethyl ketone, ethyl ether, cellosolve ether, 1,1,2,2-tetrachloroethane monochloro benzene, tetrachloroethane, O-chlorotoluene, O-dichlorobenzene, trichloroethylene, propylene carbonate, etc. Mixtures of these solvents may be employed particularly if mixtures of epoxides are employed. It is to be understood, however, that the use of solvents is not mandatory in carrying out the present invention. The exact amount of solvent necessary will depend upon the particular polymerizable material and diazonium compound employed, most of which are soluble in any event in the lactone monomers of the invention. Where they are not, the solvent is used in sufficient quantity to dissolve both the aryldiazonium compound and any insoluble polymerizable component.

The amount of photosensitive compound employed in the admixture need not be specifically ascertained but is related to the amount of monomer being polymerized. It has been found that quite satisfactory results are obtained by providing a diazonium complex salt in catalytic amounts, preferably an amount by weight of from about 0.5 to about 5% of the catalyst precursor relative to the weight of the polymerizable material provided, about 2% or less being amply effective with some of the monomer-catalyst precursor systems.

Referring to equation I hereinabove showing the photolytic decomposition of the catalyst precursor, the halide Lewis acid $MX_n$ released reacts with the monomers of the invention with a result exemplified by the following:

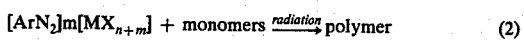
$$[ArN_2]m[MX_{n+m}] + \text{monomers} \xrightarrow{radiation} \text{polymer} \quad (2)$$

The cationic catalyst is believed to act by cleaving a carbon-oxygen bond, initiating growth of a polymeric chain or permitting formation of a cross-linkage. A general application of the process embodied by equations (1) and (2) can be as follows: a diazonium complex salt, for example, as identified hereinabove, is admixed with or without the use of a suitable solvent, with the monomer mixture. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the monomers.

The source of radiation for carrying out the method of the present invention can be any suitable source, such as the ultraviolet actinic radiation produced from a mercury, xenon, or carbon arc, or the electron beam produced by a cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorption of energy to excite the desired decomposition.

For an imaging system, a mixture of lactone with epoxides, which may contain a suitable solvent in substantial proportions, is coated on a metal plate, dried if necessary to remove solvent present, and the plate is exposed to ultraviolet light through a mask or negative. The light initiates polymerization, which propagates rapidly in the exposed image areas. The resulting polymer in the exposed areas is resistant to many or most solvents and chemicals, while the unexposed areas can be washed with suitable solvents to leave a reversal image of a polymer in this embodiment.

The polymers produced by the polymerizing process of the present invention when lactones and epoxides are admixed as above are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, offset plates, stencil-making, micro-images for printed circuitry, thermoset vesicular images, micro-images for information storage, decoration of paper, glass and packages, and light-cured coatings.

It may be desirable to include in the composition an inert pigment or filler, which may be present in even a major proportion by weight, or small amounts of inert nonvolatile liquids such as mineral oil. Inclusion of such inert ingredients usually makes advisable a proportionate increase in the optimum amount of catalyst precursor used. Nevertheless, the precursors needed rarely exceeds 5% of the entire weight of the composition.

It may further be desirable to include stabilizers or gelation inhibitors for said mixtures of monomers and catalyst. Suitable compounds for such purpose may be sulfoxides such as methyl sulfoxide, propyl sulfoxide, the 1-oxide of tetrahydrothiophene, etc. as disclosed in U.S. Pat. No. 3,711,391 issued Jan. 16, 1973; organic amides and ureas such as N, N-dimethylacetamide and 1,1,3,3-tetramethylurea as disclosed in U.S. Pat. No. 3,711,390 issued Jan. 16, 1973; cyclic amides such as 1-methyl-2-pyrrolidinone, poly(1-vinyl-2-pyrrolidinone), etc. as disclosed in U.S. Pat. No. 3,721,617 and organic nitriles such as acetonitrile as disclosed in U.S. Pat. No. 3,721,616, both issued Mar. 20, 1973. When employed as disclosed in said patents, the inhibitors are utilized in amounts which may vary from about 0.5 to 5% of the weight of the polymerizable material present in the composition, an amount of inhibitor of less than about 1% by weight of polymerizable material being nearly always sufficient.

The following examples will serve to further illustrate the present invention.

EXAMPLES 1 to 7

B-propiolactone and E-caprolactone were admixed with various epoxides in the proportions indicated with a catalyst precursor of the invention as identified in Table II below, applied to various substrates as indicated and exposed to a 360 watt mercury arc ultraviolet lamp for the time indicated below during which time reaction occurred resulting in a polymerized product after exposure. The results were as indicated in Table II.

TABLE II

| EXAMPLE NO. | LACTONE | EPOXIDE | CATALYST | SUB-STRATE | EXPOSURE TIME | RESULT |
|---|---|---|---|---|---|---|
| 1 | B-propiolactone (4 g.) | ECN* 1273-(epoxy cresol-novolac) (6 g.) | 2,5-dimethoxy-4-(p-methylphenyl)-benzene diazonium hexafluorophosphate (0.5 g.) | Aluminum | 15 sec. | Hard, dry, glossy coat, Insoluble in acetone, methylethyl ketone. |
| 2 | B-propiolactone (5 g.) | 1,2-epoxy-3-phenoxypropane (5 g.) | 2,5-dimethoxy-4-(p-methylphenyl)-benzene diazonium hexafluorophosphate (0.5 g.) | Aluminum | 45 sec. | Thickened, viscous substance. |
| 3 | B-propiolactone (8 g.) | ECN 1273 (2 g.) | 2,5-dimethoxy-4-(p-methylphenyl)-benzene diazonium hexafluorophosphate (0.5 g.) | Aluminum | 45 sec. | Tack-free, glossy coat. |
| 4 | B-propiolactone (6 g.) | ECN 1273 (4 g.) | 2,5-dimethoxy-4-(p-methylphenyl)-benzene diazonium hexafluorophosphate (0.5 g.) | Aluminum | a) 15 sec. | Tack-free, could be scratched with fingernail for 2 min. |
| 5 | E-caprolactone (15 g.) | Polyglycidyl methacrylate (2.5 g.) | 2,5-diethoxy-4-(p-tolylthio) benzene diazonium hexafluorophosphate (0.782 g.) | Glass (in ice bath) | 2 min. | Skin formed on surface. Tack-free polymer after 6½ hours. |
| 6 | E-caprolactone (5 g.) | Glycidyl Methacrylate (2.5g) | 2,5-diethoxy-4-(p-tolylthio) benzene diazonium hexafluorophosphate (0.323 g.) | Glass (in ice bath) | 2 min. | Oily amber liquid. Viscous oil after 6½ hours. |
| 7 | E-caprolactone | Glycidoxy- | 2,5-diethoxy-4-(p-tolyl- | Glass | 2 min. | Gel after 5 min. |

TABLE II-continued

| EXAMPLE NO. | LACTONE | EPOXIDE | CATALYST | SUB-STRATE | EXPOSURE TIME | RESULT |
|---|---|---|---|---|---|---|
| | (5 g.) | propyl Trimethoxysilane (5.5g) | thio) benzene diazonium hexafluorophosphate (0.345 g.) | | | Tack-free polymer after 1 hour. |

*ECN 1273 is Ciba trademark for an epoxy-cresol novolac resin with molecular weight 1080, and 0.435 equivalent/100 g.

It is thought that the invention and many of its attendant advantages will be understood from the foregoing description and it will be apparent that various changes may be made in the matter of the ingredients, the identity and their proportions and in the steps of the process and their order of accomplishment without departing from the spirit and scope of the invention or sacrificing all of its material advantages, the form hereinbefore described being merely a preferred embodiment thereof.

We claim:
1. A photopolymerizable composition comprising:
   a material photopolymerizable to higher molecular weights through the action of a cationic catalyst consisting essentially of a lactone monomer and a monomeric or prepolymeric epoxide, and as a latent catalyst precursor, a radiation-sensitive aromatic diazonium salt of a hexafluorophosphate which decomposes upon exposure to irradiation to provide a Lewis Acid effective to initiate polymerization of said material, said radiation-sensitive salt having had substantially no exposure to irradiation and being present in an amount sufficient to effect polymerization of said polymerizable material.
2. The composition of claim 1 wherein said lactone monomer is a lactone of the general formula:

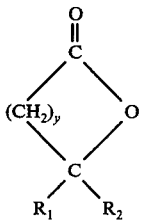

wherein $R_1$ and $R_2$ are hydrogen or an alkyl radical and $y$ is the number of methylene groups and is an integer of 1 to 13.

3. The composition of claim 2 wherein $y$ is 1.
4. The composition of claim 2 wherein $y$ is 1 and $R_1$ and $R_2$ are hydrogen.
5. The composition of claim 4 wherein said salt is 2,5-diethoxy-4-(p-tolylthio) benzene diazonium hexafluorophosphate.
6. The composition of claim 5 wherein said lactone is beta-propiolactone.
7. The composition of claim 5 wherein said salt is present in an amount of from about 0.5 to 5% by weight of said polymerizable material.
8. The composition of claim 2 wherein $y$ is 4.
9. The composition of claim 2 wherein $R_1$ and $R_2$ are hydrogen and $y$ is 4.
10. The composition of claim 9 wherein said lactone is epsilon-caprolactone.
11. The process of polymerizing a material polymerizable to higher molecular weights through the action of a cationic catalyst consisting essentially of a lactone monomer and a monomeric or prepolymeric epoxide which comprises:
    forming a mixture of said material and a radiation-sensitive aromatic diazonium salt of a hexafluorophosphate which decomposes upon exposure to electromagnetic or electron-beam irradiation to provide a Lewis Acid effective to initiate polymerization of said material,
    and subsequently exposing the resulting mixture to irradiation to release said Lewis Acid in sufficient amounts to effect polymerization of said material.
12. The process of claim 11 wherein said lactone monomer is a lactone of the general formula:

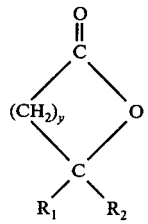

wherein $R_1$ and $R_2$ are hydrogen or an alkyl radical and $y$ is an integer of 1 to 13.

13. The process of claim 12 wherein said irradiation is electromagnetic radiation.
14. The process of claim 13 wherein said lactone is beta-propiolactone or epsilon-caprolactone.
15. The process of claim 14 wherein said salt is 2,5-diethoxy-4-(p-tolylthio) benzene diazonium hexafluorophosphate.

* * * * *